Figures 1, 2:
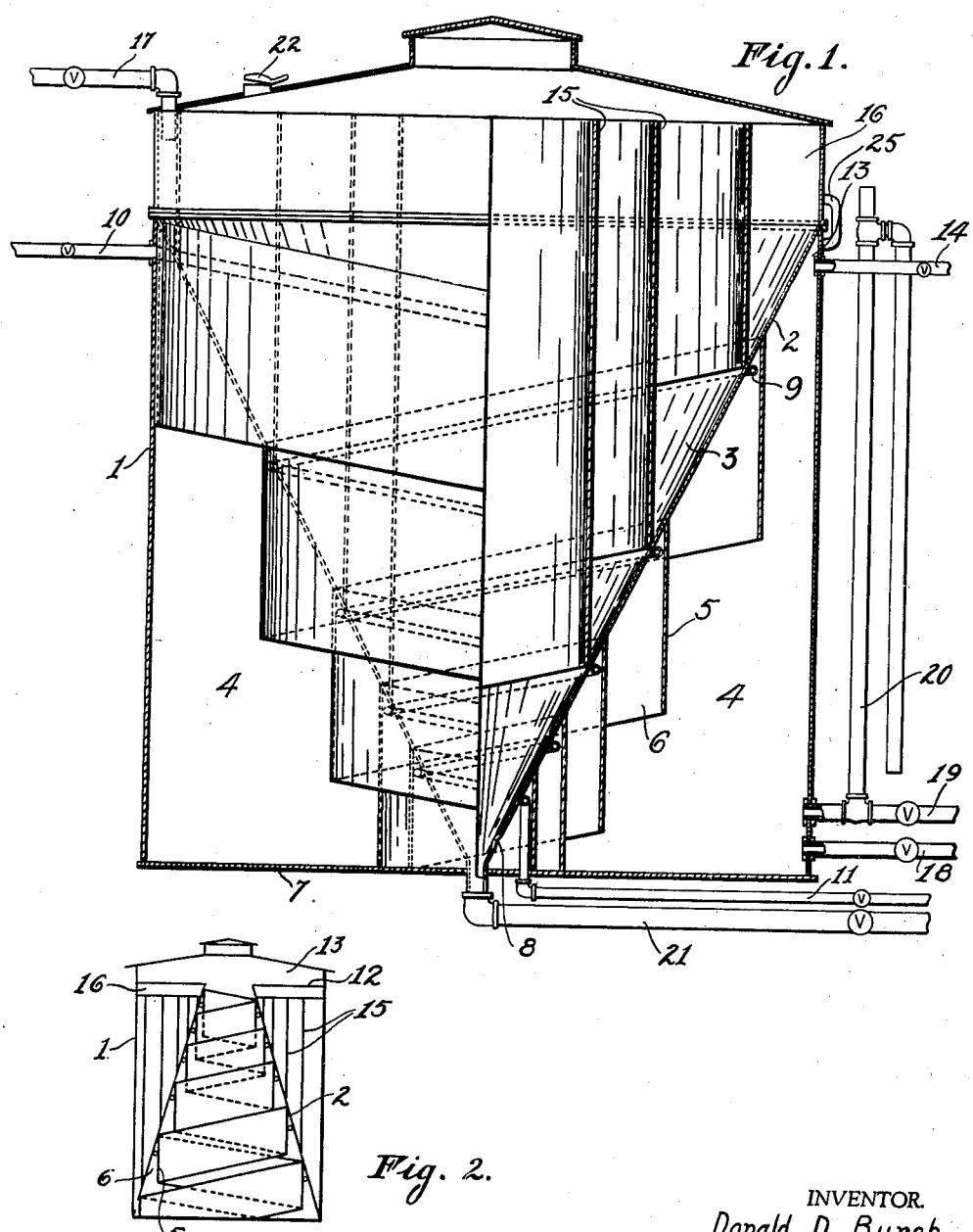

July 8, 1941.     D. D. BURCH     2,248,061
LIQUID TREATING APPARATUS
Filed May 16, 1938     2 Sheets-Sheet 1

INVENTOR.
Donald D. Burch
BY
ATTORNEYS

July 8, 1941.　　　　D. D. BURCH　　　　2,248,061
LIQUID TREATING APPARATUS
Filed May 16, 1938　　　2 Sheets-Sheet 2
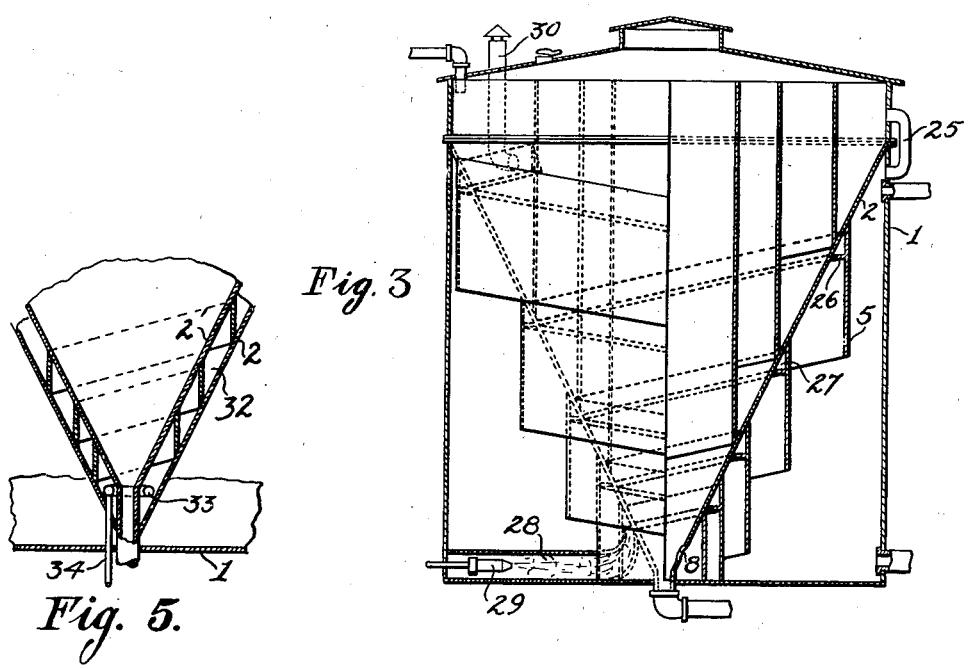
Fig. 3
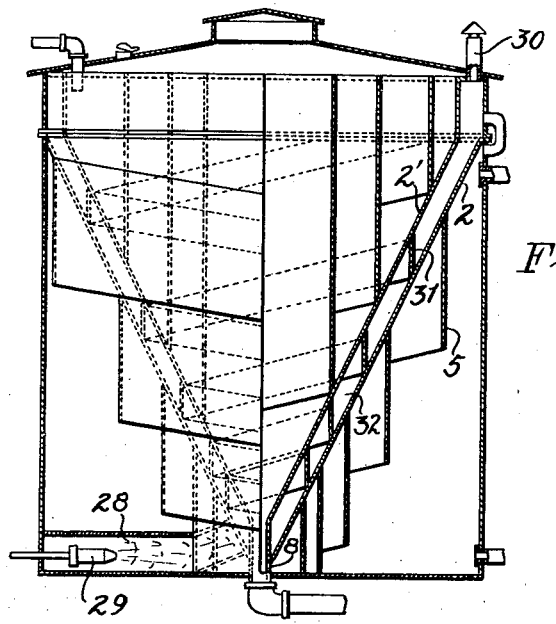
Fig. 5.
Fig. 4
INVENTOR.
Donald D. Burch
BY
ATTORNEYS Patented July 8, 1941

2,248,061

UNITED STATES PATENT OFFICE 2,248,061

LIQUID TREATING APPARATUS

Donald D. Burch, Tulsa County, Okla.

Application May 16, 1938, Serial No. 208,211

17 Claims. (Cl. 210—61)

This invention pertains to an apparatus for treating liquids, particularly mixtures of relatively immiscible liquids, with a view to separating the mixture into its component parts. More particularly the apparatus has been designed for treating oil and water mixtures, such as those obtained from oil wells in which the ingredients are more or less emulsified.

One of the objects of this invention is to provide an apparatus in which the liquid to be treated may be passed through a treating bath and caused to travel through said bath at a relatively low rate of speed so as to retain the same in the bath for an extended period while providing facilities such that the treating operation, such as the separation of the ingredients of a mixture, may progress freely and the resulting products be carried to points of collection so that they may be drawn off in a convenient manner.

Another object is to provide such apparatus whereby heat may be supplied to the mixture during the treatment.

Another object is to provide a novel apparatus for treating an oil and water mixture so as to separate the oil from the water and to provide for freedom of the separated liquids to accumulate in different portions of the bath, so that the separation thereof may be maintained and each ingredient drawn off individually.

Another object is to provide such apparatus whereby heat may be applied to the mixture throughout the operation, and also whereby the incoming liquid may be raised to a proper temperature before being delivered to the treating bath.

Further objects will appear from the following description, taken in connection with the accompanying drawings, in which Figure 1 is a partial vertical section of an apparatus embodying this invention, Figure 2 is a diagrammatic illustration similar to Figure 1 illustrating another embodiment of the invention, Figures 3 and 4 are views similar to Figure 1 illustrating other embodiments of the invention; and Figure 5 is a fragmentary view showing a modified form of heating means.

In the pumping of oil wells the liquid delivered by the pumps is usually a mixture of oil and water partly emulsified. In order to separate the water from the oil it is necessary to break the emulsion and to provide for permitting the water to settle out. In accordance with this invention a washing bath is provided through which the mixture is caused to flow in a circuitous path for an extended period during which period heat is applied, so as to promote separation of water and oil. The apparatus of this invention provides a circuitous channel through which the mixture may flow and which is immersed in a water bath. This channel is open at the bottom, so that upon separation the water may sink to the lower portion of the bath, while the oil collects in the top of the channel which maintains it separated from the water. This channel then conducts the separated oil to a collection chamber to be drawn off.

Referring to the drawings, 1 designates a deep tank which may be constructed of sheet metal or other suitable material. Mounted in the tank 1 is a conical or funnel shaped partition 2. This partition divides the volume of the tank 1 into two compartments, namely an upper compartment 3 and a lower compartment 4. Mounted in the lower compartment 4, and so as to abut the partition 2 at its upper edge and form a liquid tight joint therewith, is a deep baffle 5. This baffle is arranged in spiral form abutting the lower surface of the partition 2 so as to form between said partition and the baffle an inverted trough or channel 6. The first one or two convolutions of the baffle 5 at the lower end extend clear to the bottom 7 of the tank 1, so as to form a closed compartment from which liquid may escape only by flowing along the channel 6. The partition 2 is provided near its lower end with a port or opening 8 providing means for introducing the liquid mixture to be treated from the upper compartment 3 into the channel or trough 6.

Arranged within the trough 6, near the upper limit thereof, is a heating element 9, illustrated in the drawing in the form of a steam pipe which enters the apparatus at 10 and leaves by the pipe 11. This heating element may, of course, be of any suitable type, an electric heating device being sometimes convenient. The arrangement is such that the liquid introduced at 8 may flow upwardly along the channel 6 and remain in contact with the heater 9 so that it may be heated throughout its travel.

Near the upper portion of the lower compartment 4, between the partition 2 and the wall of the tank is a collection space 13. The baffle 5 terminates near the top of the partition 2 so that the liquid flowing along the channel 6 may collect in said space 13. An outlet pipe 14 connected to the space 13 provides for drawing off the liquid collected in that space. A vent duct 25 connects that space with the upper part of the tank 1 so as to provide for the escape of gas.

Arranged in the upper compartment 3 is a baffle 15, which is also arranged in spiral form, extending from near the top of the tank 1 downwardly to the partition 2 and forming with the latter, at its junction therewith, a substantially liquid tight joint. This baffle provides with the partition 2 a circuitous channel in the upper compartment 3 along which the liquid mixture may flow downwardly to the port 8. This channel communicates with an upper receiving chamber 16 in the upper part of the tank 1. An inlet pipe 17 provides for delivering the liquid to be treated into the chamber 16.

The tank 1 provides a water bath and may be provided with an inlet connection 18 and an outlet connection 19 in order to supply water thereto or to provide for a circulation of water therethrough. The pipe 19 may have attached thereto the usual overflow stand pipe 20. The lower end of the partition 2 is preferably provided with a drain pipe 21 adapted to carry off sludge or the like which may collect at this point.

In the operation of this apparatus the compartment 4 is filled to a desired level with water or other suitable liquid providing the treating bath. The water is maintained at a suitable level after operation is under way by adjustment of the overflow 20 in a well known manner. Steam is admitted to the heater 9 and the bath brought up to the operating temperature. The liquid to be treated may then be admitted by the pipe 17 to the compartment 16 from which it flows downwardly along the trough formed between the baffle 15 and the partition 2. During such flow the liquid is in contact with the partition 2 with which the heater 9 may also be in contact, so that the incoming liquid is heated during its downward flow along its channel. Accordingly, when this liquid reaches the port 8 it has been raised to a suitable temperature.

The mixture now enters the trough 6. Being lighter than water on account of the oil contained therein, this mixture will rise to the upper portion of the trough 6 where it is in contact with the heater 9. The mixture now begins to flow upwardly along the trough 6, being propelled by its buoyancy with reference to the water in the compartment 4. The application of heat to the mixture during this travel tends to break any emulsion and causes the oil and water to separate from one another. After such separation the oil, on account of its less density, collects in the upper portion of the trough 6 while the water sinks to the lower portion. It will be noted that this trough is open at the bottom throughout its entire length, so that the water so separated may flow out into the compartment 4. As the liquid flows upwardly along the trough 6 it continues to be heated and, therefore, continues to rise in temperature, so that any emulsion which may have formed continues to be broken to a greater extent as the liquid travels upwardly. As rapidly as the water is separated from the oil the former may sink downwardly in the tank 1 and flow out of the trough 6. Accordingly, the entire capacity of the trough is available to contain the oil as the proportion of oil to water in the mixture increases toward the top of the trough 6.

At its upper end the trough 6, which is now conducting practically pure oil, enters the collection chamber 13. The purified oil collects in this chamber and is drawn off by the pipe 14 at such a rate as to keep the process in continuous operation.

During the operation described above a continual supply of new mixture is delivered by the pipe 17 and flows downwardly in the trough provided by the baffle 15. During its downward flow it becomes heated and as it is retained for an extended time in the compartment 3 opportunity is provided for any entrapped gases to escape. Such gases collect in the upward part of the tank and may be removed therefrom by any suitable means as, for instance, the valve 22.

In cases where reagents such as emulsion breakers are used these may be added in any suitable manner to the liquid in the chamber 16, or as it flows in at the pipe 17.

In the embodiment shown in Figure 3, arrangements are made for heating the apparatus by means of so-called dry heat, namely: oil or gas flames. In this embodiment, a horizontal spiral partition 26 is arranged underneath the baffle 5 so as to form a spirally extending flue 27 between said partition, the baffle 5 and the partition 2. This flue is arranged to communicate at its lower end with a fire box 28 containing a suitable heating device, such as a burner 29, for burning gas or oil. The products of combustion pass from the fire box 28 into the lower end of the flue 27, pass along said flue to the upper end thereof where they are discharged through a suitable stack 30. In this arrangement the fluid being treated passes along the trough formed by the baffle 5 just below the partition 26.

In the embodiment of Figure 4, the partition 3 is formed double by providing a lower funnel 2 and an upper funnel 2'. These funnels are spaced from one another so as to provide for passing heated gases along between the two. A spirally extending vertical baffle 31 is arranged between the funnels 2 and 2' so as to form a spirally extending flue 32. In this case also, the lower end of this flue is arranged for communication with a fire box 28 provided with a burner 29. In this embodiment, the heated gases circulate spirally upward between the two members 2 and 2' and eventually pass out at a suitable stack 30.

Figure 5 shows a modified form of burner in the form of a ring burner indicated at 33, supplied by a pipe 34. This is a convenient manner in which to provide gas heat for this purpose.

It will be seen that this invention provides an apparatus whereby the separation of a mixture of the type here involved may be carried out in a convenient and efficient manner and by a continuous operation. The mixture entering the apparatus is carried in a circuitous path in the upper compartment, so as to permit it to be heated to a suitable temperature, and at the same time to permit entrapped gases to escape therefrom. It is then delivered to the trough 6 to flow upwardly therein while it undergoes separation into its component ingredients. During such flow the mixture is further heated so as to promote complete separation. The flow is guided by the partition 2 and the baffle 5 in an extended path, so that the mixture remains in the bath for a comparatively long time. Accordingly, a sufficient interval is provided to permit the separation of the ingredients, which sometimes takes place slowly, to be carried out completely by the time the liquid reaches the collection chamber 13. It will be noted also that the partition 2 forms a continuous guide for the liquid and provides one wall of every convolution of the trough 6. This is of great advantage where a mixture rich in oil is treated. In such a case the trough may become filled up with oil at the lower portions of its course, so that the liquid may tend to spill around the lower edge of the baffle 5. In such a case instead of the liquid spilled being lost in the compartment 4, such liquid is caught in the next upper convolution of the trough where it is retained for further processing. Accordingly, no liquid is delivered to the collection chamber 13 without being forced to travel through a considerable extent of the circuitous path provided by the trough 6.

In the embodiment of Figure 2 the partition 2 is shown in inverted position with relation to that of Figure 1, having its apex at the top. In this case the baffle 5 is placed inside of the cone and the trough 6 is formed, as before, between the baffle 5 and the partition 2. In this case, however, the collection chamber 13 is formed between a partition 12 and the top of the tank 1, while the receiving chamber 16 is formed below the partition 12. The baffles 15 in this case are on the outside of the cone. The operation of this embodiment is, of course, similar to that described for the embodiment of Figure 1.

While this invention has been described, as embodied in a unitary apparatus, it will be understood that individual features or subcombinations thereof may be useful by themselves without reference to other features or the complete combination, and that the employment of such individual features or subcombinations is contemplated by this invention and within the scope of the appended claims. It is further obvious that various changes in the details of construction may be made within the scope of the appended claims without departing from the spirit of this invention; it is understood, therefore, that the invention is not limited to the specific details shown and described.

While a certain theory of operation has been followed in the above description, it will be understood that this is for the sake of clarity in explanation, and that the invention is in no way confined to any particular theory.

Having thus described the invention, what is claimed is:

1. An apparatus of the character described, comprising, a tank, a conical partition dividing said tank into upper and lower compartments, means in said lower compartment, providing an inverted trough ascending spirally along said partition, heating means extending along said trough, means in said upper compartment for guiding liquid in a circuitous path along said partition, means providing a passage from said last means to the lower portion of said trough, and outlet means communicating with said trough.

2. An apparatus of the character described, comprising, in combination with a tank, a conical partition dividing said tank into separate upper and lower compartments, means in said lower compartment providing an inverted trough ascending spirally along said partition, heating means extending along said trough, and means for introducing a liquid mixture to flow upward along said trough.

3. An apparatus of the character described, comprising, a tank deep enough to establish a substantial difference in hydrostatic pressure between the bottom and the top thereof, a conical guide in said tank having a sufficient vertical extent to be subject to a substantial difference in such pressure, a complementary guide member extending spirally along the surface of said conical guide and forming therewith an inverted, spirally-ascending trough, and means for introducing a liquid mixture to flow upwardly along said trough.

4. An apparatus of the character described, comprising, a tank deep enough to establish a substantial difference in hydrostatic pressure between the bottom and the top thereof, a conical guide in said tank extending axially from near the bottom of said tank to near the top thereof, a complementary guide member extending spirally along the surface of said conical guide and forming therewith an inverted, spirally-ascending trough, means for introducing a liquid mixture to flow upwardly along said trough and means for heating the mixture in said trough.

5. An apparatus of the character described, comprising, a tank deep enough to establish a substantial difference in hydrostatic pressure between the bottom and the top thereof, a conical guide in said tank extending axially from near the bottom of said tank to near the top thereof, a complementary guide member extending spirally along the surface of said conical guide and forming therewith an inverted, spirally-ascending trough, means for introducing a liquid mixture to flow upwardly along said trough and heating means extending along said trough.

6. An apparatus of the character described, comprising, a tank deep enough to establish a substantial difference in hydrostatic pressure along the depth thereof, a guide in said tank having a sufficient vertical extent to be subject to a substantial difference in such pressure, a complementary guide member extending circuitously along the surface of said first guide and forming therewith an inverted circuitously-ascending trough, means for introducing a liquid mixture to flow upwardly along said trough, and a collection chamber near the top of said first guide into which said trough leads.

7. An apparatus of the character described, comprising, in combination with a deep tank, a guide in said tank extending upwardly from near the bottom of said tank to near the top thereof, and complementary guide members extending circuitously along the inner and outer surfaces respectively of said first guide providing gradually ascending and descending troughs adapted for flow of a liquid mixture therealong.

8. An apparatus of the character described, comprising, in combination with a tank, deep enough to establish a substantial difference in hydrostatic pressure along the depth thereof, a guide in said tank extending upwardly from near the bottom of said tank to near the top thereof constructed and arranged to form a collection space below the upper portion thereof, a complementary guide forming with said first guide a circuitously-ascending inverted trough communicating with said collection space, and means to cause a liquid to traverse said trough.

9. An apparatus of the character described, comprising, a deep tank, a conical guide in said tank extending axially from near the bottom of said tank to near the top thereof, a complementary guide member extending spirally along the lower surface of said conical guide and forming therewith an inverted, spirally-ascending trough, a second complementary guide member extending spirally along the upper surface of said conical guide and forming therewith a spirally descending trough, and means providing a passage connecting the lower portions of said troughs.

10. An apparatus of the character described, comprising, in combination with a deep tank, a conical guide in said tank extending axially from near the bottom of said tank to near the top thereof, a complementary guide member extending spirally along the lower surface of said conical guide and forming therewith an inverted, spirally-ascending trough, a second complementary guide member extending spirally along the upper surface of said conical guide and forming therewith a spirally descending trough, means providing a passage connecting the lower portions of said troughs, means for introducing a liquid mixture to flow along said troughs, and means for heating the liquid in one of said troughs.

11. An apparatus of the character described, comprising, in combination with a deep tank, a conical guide in said tank extending axially from near the bottom of said tank to near the top thereof, a complementary guide member extending spirally along the lower surface of said conical guide and forming therewith an inverted, spirally-ascending trough, a second complementary guide member extending spirally along the upper surface of said conical guide and forming therewith a spirally descending trough, means providing a passage connecting the lower portions of said troughs, means for introducing a liquid mixture to flow along said troughs, and heating means arranged to heat the liquid in both said troughs.

12. An apparatus of the character described, comprising, in combination with a deep tank, a conical guide in said tank extending axially from near the bottom of said tank to near the top thereof, a complementary guide member extending spirally along the lower surface of said conical guide and forming therewith an inverted, spirally-ascending trough, a second complementary guide member extending spirally along the upper surface of said conical guide and forming therewith a spirally descending trough, means providing a passage connecting the lower portion of said troughs, a collection chamber near the top of said tank into which said first trough leads, means for introducing a liquid mixture to flow along said troughs, and means for heating the liquid in one of said troughs.

13. An apparatus of the character described, comprising, in combination with a washing tank, a circuitously ascending inverted trough in said tank, a conduit extending along the upper portion of said trough, and means for passing a heating fluid through said conduit.

14. An apparatus of the character described, comprising, in combination with a washing tank, a double partition in said tank, a baffle providing a circuitously ascending trough adjacent said partition, dividing means in said partition forming therein a conduit, and means for passing a heating fluid through said conduit.

15. An oil-treating apparatus of the character described, comprising, a deep tank providing a treating bath, a sloping partition dividing said tank into upper and lower portions, an upwardly-extending guide joining said partition to form a channel leading in a circuitous path through said upper portion, and a downwardly-extending guide joining said partition to form an inverted trough extending in a circuitous path through said lower period, traversing a major part of the depth of said tank and communicating at its lower portion with said channel.

16. An oil-treating apparatus of the character described, comprising, a deep tank providing a treating bath, a sloping partition dividing said tank into upper and lower portions, an upwardly-extending guide joining said partition to form a channel leading in a circuitous path through said upper portion, a downwardly-extending guide joining said partition to form an inverted trough extending in a circuitous path through said lower portion, traversing a major part of the depth of said tank and communicating at its lower portion with said channel, and heating means extending along said trough.

17. An oil-treating apparatus of the character described, comprising, a deep tank providing a treating bath, a sloping partition dividing said tank into upper and lower portions, an upwardly-extending guide joining said partition to form a channel leading in a circuitous path through said upper portion, a downwardly-extending guide joining said partition to form an inverted trough extending in a circuitous path through said lower portion, traversing a major part of the depth of said tank and communicating at its lower portion with said channel, said partition providing a wall for each said channel and said trough, and heating means extending along said partition and following said trough adapted to heat liquid in both said trough and said channel.

DONALD D. BURCH.

CERTIFICATE OF CORRECTION.

Patent No. 2,248,061.  July 8, 1941.

DONALD D. BURCH.

It is hereby certified that error appears in the printed specification of the above numbered patent requiring correction as follows: Page 4, second column, line 20, claim 15, for the word "period" read --portion--; and that the said Letters Patent should be read with this correction therein that the same may conform to the record of the case in the Patent Office.

Signed and sealed this 26th day of August, A.D. 1941.

Henry Van Arsdale,
Acting Commissioner of Patents.

(Seal)